No. 843,201. PATENTED FEB. 5, 1907.
H. M. FRANK.
SHAFT COUPLING.
APPLICATION FILED JUNE 30, 1906.

Witnesses:
C. J. Belt
L. E. Money

Inventor:
Henry M. Frank,
By W. H. Wills,
Attorney.

THE NORRIS PETERS CO., WASHINGTON, D. C.

UNITED STATES PATENT OFFICE.

HENRY M. FRANK, OF EL PASO, TEXAS.

SHAFT-COUPLING.

No. 843,201. Specification of Letters Patent. Patented Feb. 5, 1907.

Application filed June 30, 1906. Serial No. 324,121.

*To all whom it may concern:*

Be it known that I, HENRY M. FRANK, a citizen of the United States, residing at El Paso, in the county of El Paso and State of Texas, have invented certain new and useful Improvements in Shaft-Couplings, of which the following is a specification.

This invention relates to shafting, and has special reference to shaft-couplings of the interlocking class.

The object of the invention is to provide a sleeve-like coupling divided longitudinally into two parts or halves of novel and peculiar shape and adapted to be keyed together and to shaft ends without relatively sliding the parts.

A further object of the invention is to provide a split shaft-coupling having dovetail longitudinal faces fitting one within the other and the shaft ends, so as to encircle the latter and leave a pair of key-seats between the dovetail parts.

Shaft-couplings of this character have been arranged with interlocking parts to slide lengthwise one within the other and provided with various means and devices for clamping them together and to shaft ends; but the parts interlock without intervening keys.

It is therefore the purpose of this invention to provide a split coupling the interlocking parts of which form key-openings or seats for keys which constitute the only means of clamping the parts together.

Figure 1:
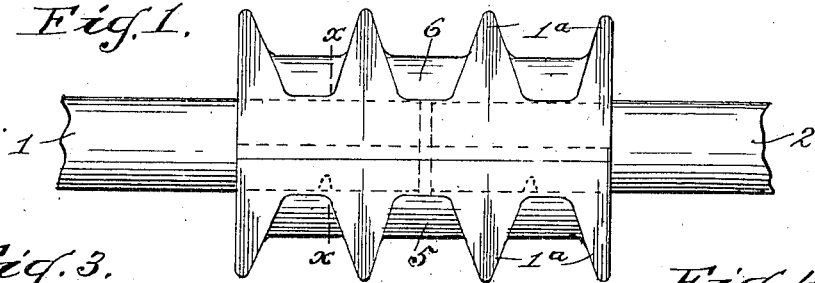
Figure 3:
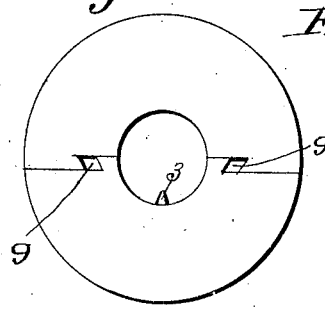
Figure 2:
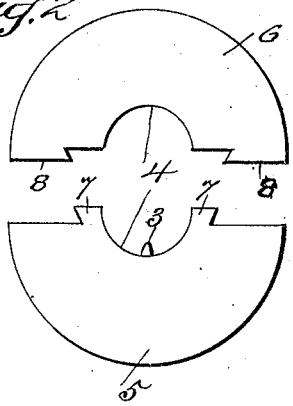
Figure 4:
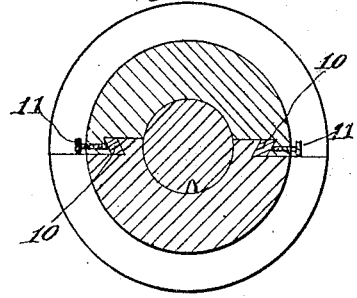
Figure 5:
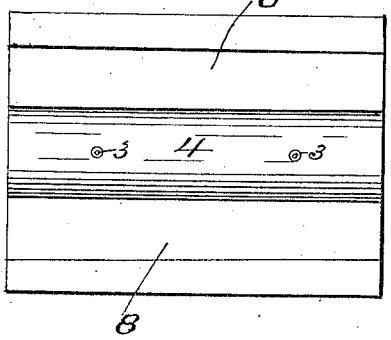
Figure 6:
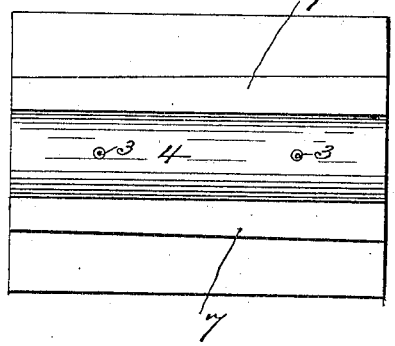
Figure 7:
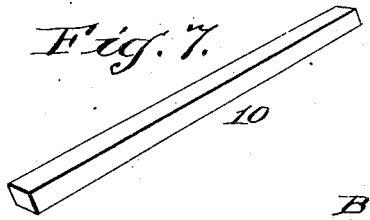

In the accompanying drawings, forming part of this application, Figure 1 is a side elevation showing the application of the invention. Fig. 2 is an end view showing the coupling in position to be applied to shaft ends. Fig. 3 is a similar view showing the parts in position to receive the keys. Fig. 4 is a section on the line $x\ x$, Fig. 1. Fig. 5 is a face view of one half of the coupling. Fig. 6 is a similar view of the other half of the coupling. Fig. 7 is a perspective view of one of the keys.

The same reference-numerals denote the same parts throughout the several views of the drawings.

The ends of the shafts 1 and 2 have one or more cavities for pins 3, which are formed in one or both shaft-bearings 4 of the coupling parts 5 and 6. The exterior of the parts 5 and 6 have strengthening-ribs $1^a$; but these may be omitted, and the outer surface of said parts may be of any desired shape or form.

The coupling-half 5 has a longitudinal cleat 7 on each side of its shaft-bearing, the outer edge of the cleats being beveled, and they taper throughout their length in opposite directions. The coupling-half 6 has a longitudinal flange 8 on each side flush with the periphery of the coupling-half. The inner edge of these flanges are beveled and taper in opposite directions.

The coupling parts fit into each other in dovetail fashion without the beveled edge of the cleats engaging the beveled edges of the flanges and leaving a diamond-shaped key seat or opening 9 between the said edges for tapering beveled-edged keys 10, which are diamond-shaped in cross-section and are prevented from displacement by set-screws 11.

It is obvious that the key openings or spaces permit the halves of the coupling to be placed on the shaft ends face to face and in position to receive the keys without sliding the parts or longitudinal adjustment of them one to the other.

Having thus described my invention, what I claim as new, and desire to secure by Letters Patent, is—

A longitudinally-dovetailed shaft-coupling comprising a coupling-half having a pair of beveled-edged cleats next to the shaft-bearing, a coupling-half having a pair of beveled-edged flanges removed from the shaft-bearing to form key seats or spaces between the cleats and the flanges, said cleats and flanges being tapered lengthwise, and tapering diamond-shaped keys fitting the spaces for locking the parts together and to a shaft, substantially as shown and described.

In witness whereof I hereunto set my hand in the presence of two witnesses.

HENRY M. FRANK.

Witnesses:
J. T. MURRAY,
H. P. NOAKE.